May 4, 1954   J. F. NAYLOR   2,677,748
ELECTRICAL HEATING OF BAKING OVENS
Filed Oct. 30, 1951

JOSEPH FRANCIS NAYLOR, *Inventor*
By
Attorney

Patented May 4, 1954

2,677,748

UNITED STATES PATENT OFFICE 2,677,748

ELECTRICAL HEATING OF BAKING OVENS

Joseph Francis Naylor, Newton-le-Willows, England, assignor to T. & T. Vicars Limited, Earlestown, Newton-le-Willows, England, a British company Application October 30, 1951, Serial No. 253,816

Claims priority, application Great Britain November 6, 1950

1 Claim. (Cl. 219—35)

The present invention relates to improvements in electrically heated baking ovens.

An object of the present invention is to provide a means whereby the heat distribution over an oven may be controlled in a simple manner without the use of skilled labour or the dismantling of electrical or oven parts.

The improvements of the present invention are particularly suitable for the electrical heating of ovens where the electrical supply is three-phase or multi-phase, as it is obviously desirable to maintain the phases in balance in order to maintain a desirable power factor.

With this object in view, it has been proposed to provide a plurality of electrical resistance heating elements in series on a common support with switch control by which one or more of said elements may be cut into or out of circuit.

In travelling sole ovens a heat balancing corrective is usually necessary, as it has been proved that with an equal amount of heat being emitted uniformly across each heating unit, the goods are overbaked in the center of the oven width, and more lightly baked at each side.

Therefore it follows that a reduction of the heat is required in the center, and an increase of heat is necessary at the sides nearest the oven walls.

An object of the present invention is to provide means by which the heat in each side zone can be augmented sufficiently to balance and produce a perfectly uniform baking of the goods across the full width of the conveyor sole.

The important feature in any three-phase electrically heated oven is to maintain the phases in balance. For this reason the known heat correcting methods are arranged in a group or a bank. The disadvantage of such arrangement is that the correction effect is produced at somewhat localised points.

According to the present invention an electric resistance rod or bar heating element for a baking oven is formed as a unit of a different heat emission from its middle point to one end than from its middle point to the other end, and has electrical connections at its ends.

These ends are preferably similar, so that the unit can be turned round end for end to alter the heat emission on one side of the oven as compared with the other in the area adjacent the said heating element.

It will consequently be seen that where a number of such elements is disposed in an oven, usually laterally across the oven by being mounted in the oven walls, to be readily detached therefrom, the heat loading of a given area of the oven may be controlled within wide limits by a simple removal of an element and its replacement end for end.

Plug and socket means may be provided for bridging the exposed end terminals at the end of the unit remote from the supply, or to receive connections to the supply mains.

It will thus be seen that the total electrical loading of the oven remains completely constant, but considerable heat variation can be obtained at, for instance, its sides compared with its center.

The invention is further described with reference to the accompanying drawings in which.

In an electrically heated oven a number of bar or rod heating elements, which may be of any known form, is disposed across the oven, that is to say at right angles to its axis which, in the case of a travelling band oven, will be the direction of movement of the said band, these elements being, however, according to the present invention, of appreciably different heat emission from their middle point $a$ (Figs. 1–4) to one end of the element $b$ than from the said middle point $a$ to the other end $c$.

Figure 1:
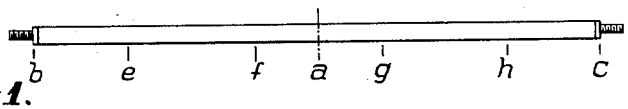
Fig. 1 is a diagrammatic view of a heating element.
Figure 2:
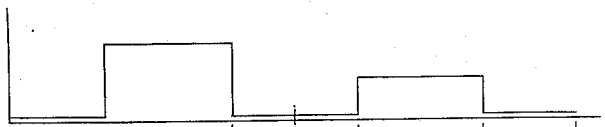
Figs. 2, 3 and 4 are diagrams indicating heat emission along various forms of heating element.

In the particular unit illustrated by way of example in Fig. 1, a length of the unit $e$—$f$ may have a heat emission of two-thirds of the total kilowatt loading, while a length $g$—$h$ has a heat emission of one-third of the total kilowatt loading, the lengths $e$—$f$ and $g$—$h$ of the resistance elements forming the heat emission body being of similar length. The heat emission curve will therefore correspond to the diagram of Fig. 2.

Figure 3:
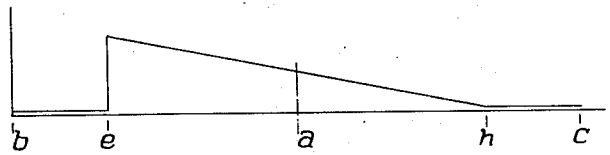
Figure 4:
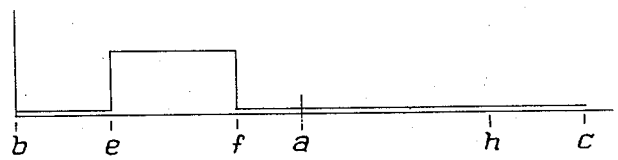

Figs. 3 and 4 show, by way of example, other forms of differential heat emission longitudinally of the rod or bar heat radiating element.

Figure 5:
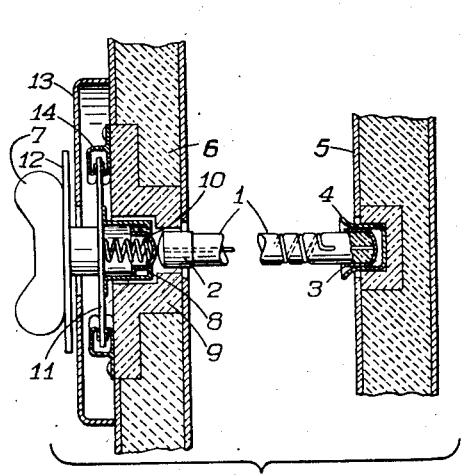
Fig. 5 shows, by way of example, in sectional elevation, the walls of an oven fitted with a heating element.
Figure 6:
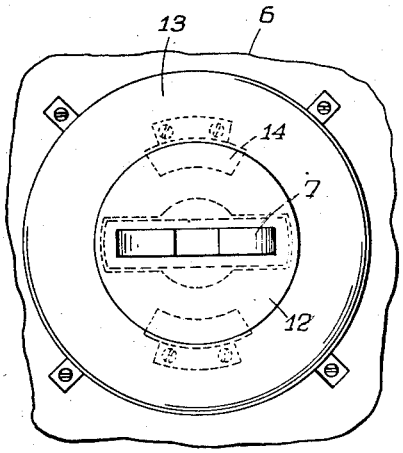
Fig. 6 is a corresponding front view.

By providing a socket connection for the element on one wall of the oven connected to one electrical lead and a contact connection in an opening passing through the opposite wall of the oven, it will obviously be possible to rapidly interchange the elements, and if these have similar end connections, they may be reversed end for end to alter the heating on one side of the oven as compared with the other. One such arrangement, shown by way of example, is illustrated in Figs. 5 and 6, where a bar or rod 1 wound with an electric resistance wire to give a greater heat emission from one half its length as compared with the other half, has the electric resistance wire connected to a pair of similar end caps 2, 3, the end cap 3 being received within a split metallic socket 4 mounted in one wall of the oven 5, which is usually the rear wall, and connected to one supply lead of the electric power, while the other wall 6 has an opening through which the element 1 can be introduced, this opening including a closing plug, which may conveniently also form a control switch, so that current is broken to parts leading to the cap 2 when the plug is removed from the opening for inspection, removal, interchange or reversal end for end of the element 1.

One form of convenient combined plug switch may comprise a handle 7 having a cylindrical boss 8 fitting in an insulating bush 9 in the wall 6 of the oven, this bush serving to guide the element 1. The cylindrical boss 8 includes a spring pressure contact cap 10. The insulated handle 7 carries a blade 11 so that when the handle is in the position shown in Fig. 6, the blade 11, shrouded by the insulating guard plate 12, can be inserted through the opening in the casing 13, whereupon if the handle 7 is then turned from the position shown in Fig. 6 through 90° into the position shown in Fig. 5, the plug carried by the handle 7 is maintained in position with strong bearing electrical contact between the contact cap 10 and the cap 2, and electrical connection is completed through the blade 11 to the usual form of knife engaging contact 14 connected to the other electrical lead.

If desired, additional switch means may be provided to control the number of such units in circuit at any given time, a common switch preferably controlling simultaneously elements of equivalent electrical loading connected to the various phases of the supply mains.

The novel elements of variable electrical loading per unit length may, of course, be used additionally with elements of constant loading per unit length, the total electrical loading being the same in each case and the elements interchangeable.

Where the electrical energy supply is in the form of three-phase current and means are provided to bring into or out of circuit a number of heating elements evenly distributed over the three phases, it will be desirable that such control arrangements may initially insert units according to the present invention into the circuit, but once so inserted they will not be switched into or out of circuit to provide variable heat control, which will be effected solely by the switching in or out of the three-phase circuits individual heating elements of constant loading per unit length or groups of such units.

I claim:

An electrically heated baking oven comprising, in combination, a plurality of horizontally spaced sockets in one wall connected to one electrical power lead, a plurality of individual electric resistance bar elements of appreciably different heat emission from their middle point to one end than from their middle point to the other end and having similar integral electric contact connections at each end, said elements being insertable in said sockets through holes in the opposite wall of said oven horizontally opposite the spaced sockets in the other wall, and combined closing plug and contact elements insertable in said openings to complete electric contact to said bar resistance electric elements and simultaneously close the holes in said wall.

References Cited in the file of this patent

UNITED STATES PATENTS

| Number | Name | Date |
|---|---|---|
| Re. 19,089 | Parker | Feb. 20, 1934 |
| 730,252 | Gold | June 9, 1903 |
| 1,108,890 | Davenport | Sept. 1, 1914 |
| 1,110,532 | Byce | Sept. 15, 1914 |
| 1,191,196 | Kuhn et al. | July 18, 1916 |
| 1,742,286 | Shaw | Jan 7, 1930 |

FOREIGN PATENTS

| Number | Country | Date |
|---|---|---|
| 527,056 | France | Oct. 20, 1921 |
| 632,747 | Great Britain | Dec. 5, 1949 |